(12) United States Patent
Mosier et al.

(10) Patent No.: US 7,634,778 B2
(45) Date of Patent: Dec. 15, 2009

(54) OPERATING SYSTEM MANAGING A LINKED LIST OF CALLBACK DYNAMIC FUNCTION TABLES FOR ACQUIRING EXCEPTION HANDLING INFORMATION FROM A RUNTIME ENVIRONMENT

(75) Inventors: Scott D. Mosier, Redmond, WA (US); Ian H. Carmichael, Sammamish, WA (US); Lawrence B. Sullivan, Renton, WA (US); James J. Radigan, Redmond, WA (US); David N. Cutler, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 1423 days.

(21) Appl. No.: 10/609,267

(22) Filed: Jun. 26, 2003

(65) Prior Publication Data

US 2004/0268370 A1   Dec. 30, 2004

(51) Int. Cl.
  G06F 3/00 (2006.01)
  G06F 9/44 (2006.01)
  G06F 9/46 (2006.01)
  G06F 9/45 (2006.01)
  G06F 11/00 (2006.01)

(52) U.S. Cl. ............ 719/318; 717/140; 717/148; 717/151; 717/154; 714/2; 714/25

(58) Field of Classification Search .......... 719/318; 717/140, 148, 151, 154; 714/2, 25
See application file for complete search history.

(56) References Cited

U.S. PATENT DOCUMENTS

| | | | | |
|---|---|---|---|---|
| 6,014,515 A | * | 1/2000 | Burch | 717/129 |
| 6,293,712 B1 | * | 9/2001 | Coutant | 717/155 |
| 7,007,198 B2 | * | 2/2006 | Boling | 714/15 |
| 7,426,719 B2 | * | 9/2008 | Chaiken et al. | 717/128 |
| 2002/0188931 A1 | * | 12/2002 | Ewart et al. | 717/154 |
| 2003/0023905 A1 | * | 1/2003 | Boling | 714/34 |
| 2003/0079202 A1 | * | 4/2003 | Sokolov | 717/118 |
| 2004/0128658 A1 | * | 7/2004 | Lueh et al. | 717/151 |

OTHER PUBLICATIONS

Intel, "Itanium Software Conventions and Runtime Architecture Guide", Intel Corporation, May 2001, pp. 1-100.

* cited by examiner

*Primary Examiner*—Hyung S Sough
*Assistant Examiner*—Qing-Yuan Wu
(74) *Attorney, Agent, or Firm*—Lee & Hayes, PLLC (57) ABSTRACT

In an exemplary media implementation, one or more electronically-accessible media include electronically-executable instructions that utilize an application programming interface, the application programming interface facilitating creation of callback-type dynamic function tables; each callback-type dynamic function table including a begin address, an end address, and a callback function, each callback-type dynamic function table corresponding to a code heap that stores code for multiple functions in a runtime environment; wherein interaction between the runtime environment and an operating system is precipitated upon calling the callback function to acquire exception handling and/or unwind information. In another exemplary media implementation, one or more electronically-accessible media include at least part of an operating system that is configured to request from a runtime environment exception handling and/or unwinding information for functions that are managed by the runtime environment.

26 Claims, 8 Drawing Sheets

OPERATING SYSTEM MANAGING A LINKED LIST OF CALLBACK DYNAMIC FUNCTION TABLES FOR ACQUIRING EXCEPTION HANDLING INFORMATION FROM A RUNTIME ENVIRONMENT

TECHNICAL FIELD

This disclosure relates in general to exception handling and in particular, by way of example but not limitation, to facilitating exception handling with regard to functions of a runtime environment.

BACKGROUND

A computer program typically includes many functions/methods that are executed while the computer program is running. The functions are executed by one or more processors in conjunction with at least one memory. The memory is used to store information for the functions, and such memory may include processor registers, cache memory, one or more stacks, main memory, some combination thereof, and so forth. A stack, for example, is usually employed to store information for multiple functions in a linear (e.g., temporal) manner.

Figure 1:
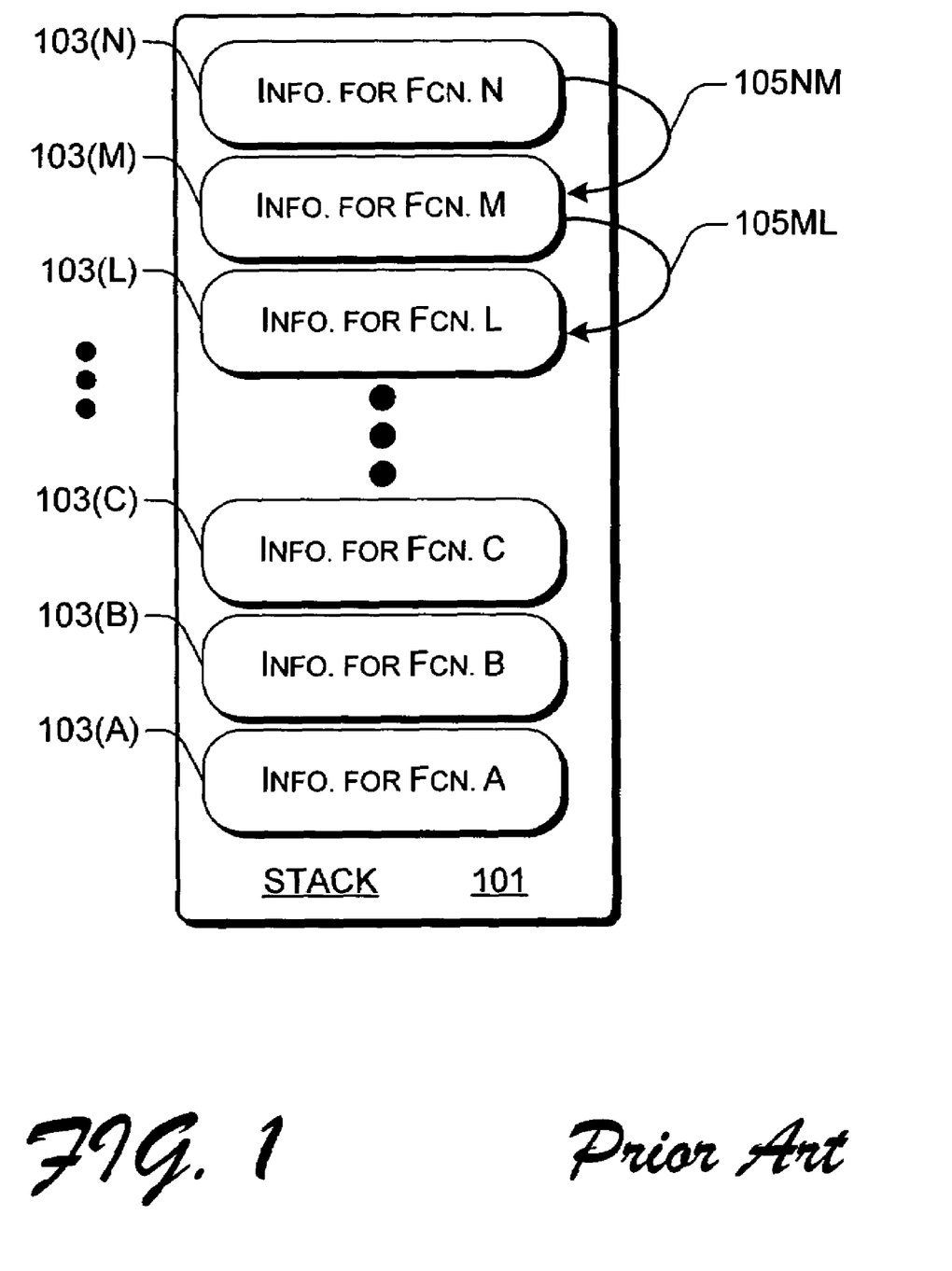
FIG. 1 is a conventional stack that illustrates an exemplary unwinding thereof for handling an exception.

FIG. 1 is a conventional stack 101 that illustrates an exemplary unwinding 105 thereof for handling an exception. As shown, stack 101 relates to multiple functions A, B, C . . . L, M, and N. As each function is called or as one function transitions to another function, information for a function 103 is added to the stack. An example of such information is a frame or a call frame.

For example, information for function A 103(A) is at the bottom (or at least the lowest illustrated portion) of stack 101. When function B is called, information for function B 103(B) is added onto stack 101. Similarly, information for function C 103(C) . . . information for function L 103(L), information for function M 103(M), and information for function N 103(N) are gradually added to the stack.

Each of information for a function 103 may include such information as ongoing variable(s), stack pointer(s), instruction pointer(s), data in the registers of processor(s) that represents at least part of a current state of the processor(s), some combination thereof, and so forth. This information may be useful when an exception occurs.

Although modern programming entails significant debugging and testing, every imaginable event cannot be fully predicted. Such unexpected events can be accommodated and/or hidden from user view through exception handling routines/procedures. However, every function does not usually include error handling information. To reach a function that includes error handling information, stack 101 is unwound until information for a function 103 relates to a function that can handle unexpected events. In other words, information entries 103 of stack 101 are traced back through, walked back up, etc. during a typical error handling procedure.

To that end, assuming function N cannot handle the experienced exception, stack unwinding 105 NM is used to unwind stack 101 from a state appropriate for function N to a state appropriate for function M. If function M also does not possess appropriate error handling information, stack unwinding 105ML is used to unwind stack 101 from a state appropriate for function M to a state appropriate for function L. Stack 101 is thusly unwound until information for a function 103 that relates to a function that can handle the unexpected event is reached.

Figure 2:
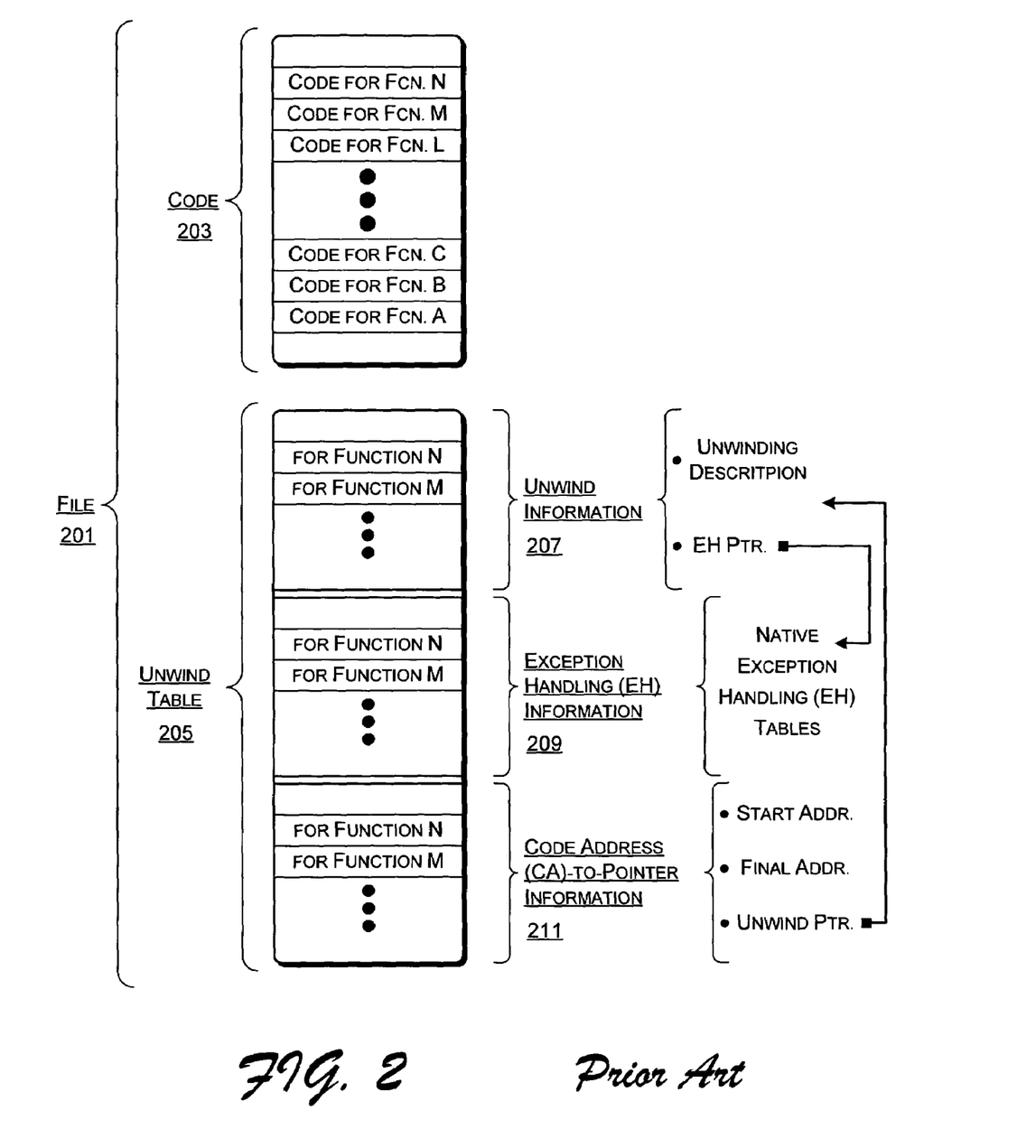
FIG. 2 is a conventional compiled file in a static format.

FIG. 2 is a conventional compiled file 201 in a static format. After a file is written by a programmer using an editor to produce source code, a compiler is applied to the source code to produce object code in a machine language that is processor-consumable (e.g., a program executable file). The compiler is afforded the opportunity to consider all of the source code (possibly over multiple iterations of compiling) to "optimize" the organization of the object code while considering all objects, references, functions, error handling capabilities, and so forth. The compiler can thus produce a file 201 that is neatly organized in a predictable, static format.

An exemplary organization for file 201 includes first and second portions: code 203 and an unwind table or tables 205. Code 203 organizes individual code sections for functions A-N in an ordered fashion. Specifically, code 203 illustrates code for function A, code for function B, code for function C . . . code for function L, code for function M, and code for function N.

Unwind table 205 is organized into three parts: unwind information 207, exception handling (EH) information 209, and code address (CA)-to-pointer information 211. Each of these three parts 207, 209, and 211 are subdivided into sections that are directed to particular functions. Specifically, each part 207, 209, and 211 illustrates sections for function N, for function M . . . . Although not explicitly illustrated, each part 207, 209, and 211 may have sections for all functions A, B, C . . . L, M, and N. In certain described implementations, unwind information 207 corresponds to so-called "r data", exception handling information 209 corresponds to so-called "x data", and code address (CA)-to-pointer information 211 corresponds to so-called "p data".

For CA-to-pointer information 211, each section that is directed to a particular respective function includes one or more of at least three entries: a start address, a final address, and an unwind pointer. The start address and the final address relate to the addresses of the code for the respective function in code 203. These addresses may be relocatable virtual (RVA) addresses that are offsets from the beginning of code 203 and/or file 201. The unwind pointer is a reference that points to a section of unwind information 207 for the respective function. Thus, CA-to-pointer information 211 may imply that information from the address range of the coding to an unwind pointer for a function is provided, may imply that information for a mapping from instruction pointer (IP) addresses associated with a function to an unwind pointer thereof is provided, may imply that both information types are provided, and so forth.

As illustrated for unwind information 207, each section that is directed to a particular respective function includes at least two entries: an unwinding description and an exception handling (EH) pointer. The unwinding description describes how the stack can be unwound from the particular respective function back to the previous function. For example, an unwinding description of unwind information 207 for function N describes how to effectuate stack unwinding 105NM for stack 101. Each exception handling pointer for a respective function is a reference that points to a section of exception handling information 209 for that respective function.

For exception handling information 209, each section (if present) includes exception handling information for a particular respective function. The exception handling information includes (native) exception handling tables or similar that explains how to handle one or more exceptions that have been experienced.

Illustrated file 201, and unwind table 205 thereof, can be effectively navigated quickly by an operating system (OS) when an exception occurs because it is cleanly and orderly organized. Consequently, standard computer science algorithms targeted to searching for and/or locating desired information may be employed.

Unfortunately, code that is compiled on-the-fly and/or in ad hoc situations cannot be so easily organized logically and orderly in prescribed manners with predictable, static formats. Accordingly, there is a need for schemes and techniques that facilitate exception handling in a dynamic environment.

SUMMARY

In an exemplary media implementation, one or more electronically-accessible media include electronically-executable instructions that utilize an application programming interface, the application programming interface facilitating creation of callback-type dynamic function tables; each callback-type dynamic function table including a begin address, an end address, and a callback function, each callback-type dynamic function table corresponding to a code heap that stores code for multiple functions in a runtime environment; wherein interaction between the runtime environment and an operating system is precipitated upon calling the callback function to acquire exception handling and/or unwind information. In another exemplary media implementation, one or more electronically-accessible media include at least part of an operating system that is configured to request from a runtime environment exception handling and/or unwinding information for functions that are managed by the runtime environment.

In an exemplary electronic device implementation, an electronic device includes: a runtime environment that is managing code for multiple functions; and an operating system that is managing a linked list of dynamic function tables that are searched when an exception occurs, the operating system adapted to call a callback function as indicated by a dynamic function table of the linked list of dynamic function tables to request that the runtime environment provide exception handling and/or unwind information for at least one function of the multiple functions; wherein the runtime environment is capable of providing to the operating system the exception handling and/or unwind information for the at least one function of the multiple functions responsive to the callback function.

In another exemplary media implementation, one or more electronically-accessible media include a data structure, the data structure including: a begin address; an end address; and a callback function that, when called, returns from a runtime environment exception handling and/or unwind information for a function associated with at least one address that is between the begin address and the end address.

In another exemplary media implementation, one or more electronically-accessible media include electronically-executable instructions that include: a callback function, the callback function accepting as input an instruction pointer that is associated with an address of a function from a runtime environment and producing as output data for code address-to-pointer information for the function having the address that is associated with the instruction pointer; wherein the callback function may be called by an operating system and implemented by the runtime environment.

Other method, system, approach, apparatus, application programming interface (API), device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 3:
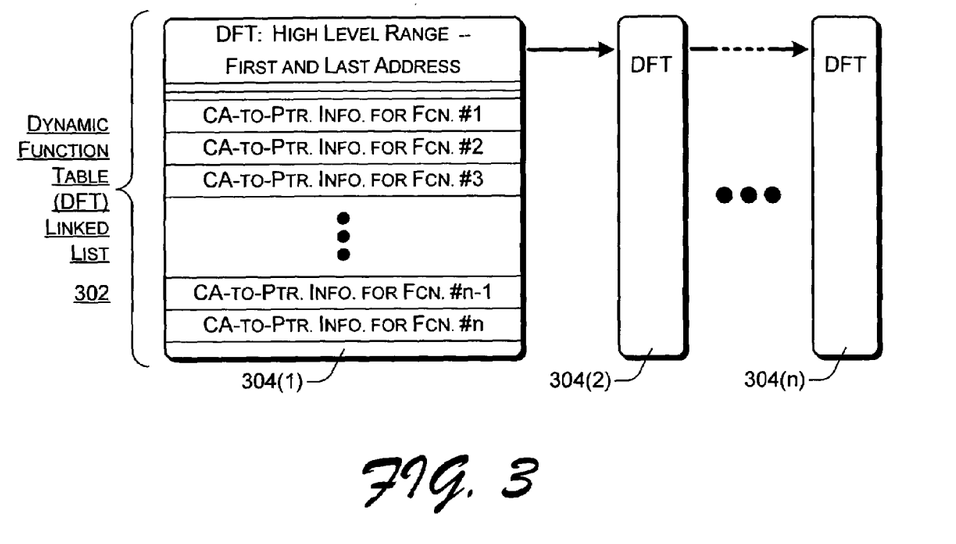
FIG. 3 illustrates an exemplary dynamic function table (DFT) linked list.

FIG. 3 illustrates an exemplary dynamic function table (DFT) linked list 302. Dynamic function table linked list 302 includes multiple dynamic function tables 304. As illustrated, dynamic function table 304(1), dynamic function table 304(2) . . . dynamic function table 304(n) are linked together into a list. Although not so illustrated, dynamic function table linked list 302 may alternatively be linked both backwards and forwards (e.g., doubly-linked) or linked in some other manner.

In a described implementation, dynamic function table linked lists 302 may be used, for example, for code that is not completely compiled into a static file. Each particular process may correspond to a particular dynamic function table 304. A header of the particular dynamic function table 304 includes a high level address range of the entire process, such as a first address and a last address of the process.

Generally, each dynamic function table 304 also includes a list of CA-to-pointer information for multiple functions. As shown for dynamic function table 304(1) specifically, a listing of "n" entries for CA-to-pointer information for functions #1, #2, #3 . . . #n−1, and #n is included. Each CA-to-pointer information entry may include, for example, a start address, a final address, and an unwind pointer for the respective function to which the entry is directed. In certain described implementations, each entry of CA-to-pointer information for a given function may correspond to a so-called "runtime function entry".

Hence, each dynamic function table 304 is directed to a process and includes multiple CA-to-pointer information entries. Each respective CA-to-pointer information entry is directed to a respective function of the process and includes CA-to-pointer information for the respective function. The listing of CA-to-pointer information entries in any given dynamic function table 304 may be sorted or unsorted.

When an exception is experienced, an OS of the device or system uses the relevant current instruction pointer to check a high level range of each header for each dynamic function table 304 until a match is found. In other words, the OS moves along dynamic function table linked list 302 from one dynamic function table 304 to the next and checks to determine if the instruction pointer is an address that is between the first address and the last address. If so, a dynamic function table 304 match is found, and a CA-to-pointer information entry for the particular function at issue is (assuming no errors) present somewhere in that matching dynamic function table 304.

The OS then traverses the listing of CA-to-pointer information entries in the matched dynamic function table 304 until the CA-to-pointer information entry that has a start address and a final address defining a range that includes the instruction pointer is located. This CA-to-pointer information entry is for the particular function at issue. The OS can then use the unwind pointer in this CA-to-pointer information entry to locate unwind information and proceed to handling the exception.

Thus, when an exception occurs, the OS moves along dynamic function table linked list 302 until a matching dynamic function table 304 is found, and it then traverses the entries thereof until the matching CA-to-pointer information entry for the function currently being examined or unwound is located. Due to the linear nature of this approach, it is satisfactory as long as the length of dynamic function table linked list 302 does not become too excessive, especially to the extent that sorted dynamic function tables 304 are utilized. However, in a runtime environment, the length of dynamic function table linked list 302 can quickly become unwieldy and unmanageable.

Figure 4:
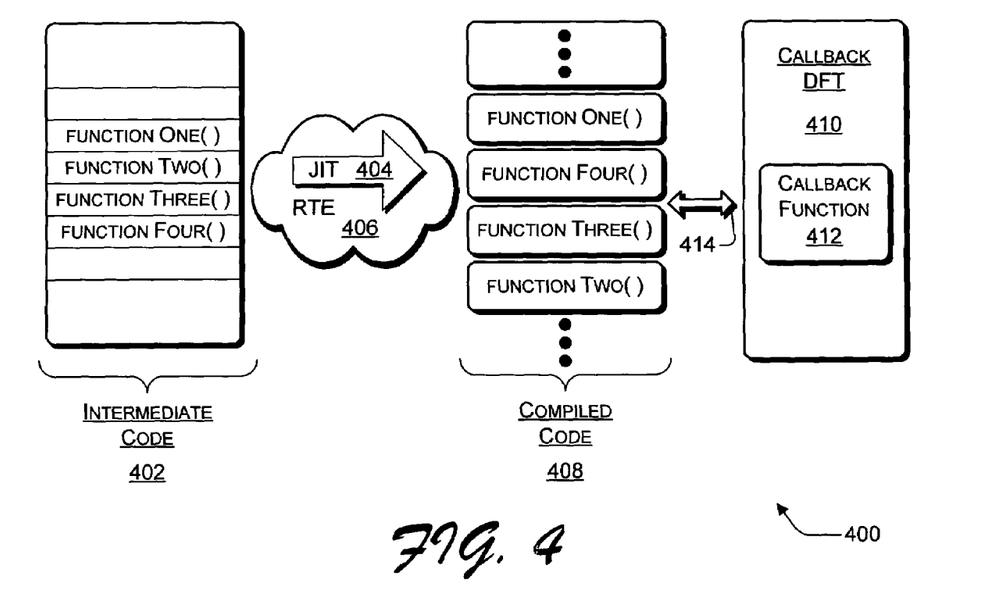
FIG. 4 illustrates an exemplary approach to just-in-time (JIT) code compiling and a corresponding callback-type dynamic function table.

FIG. 4 illustrates an exemplary approach 400 to just-in-time (JIT) code compiling 404 and a corresponding callback-type dynamic function table 410. JIT compiling 404 operates in runtime environment (RTE) 406 to create machine language code as it is requested. This JIT code creation may be performed at a function-by-function granularity. An example of a runtime environment 406 is the common language runtime (CLR) of Microsoft® Corporation.

In a described implementation with JIT compiling 404, intermediate code 402 is provided that includes one or more functions. Optionally, intermediate code 402 may be platform independent (e.g., "write-once") code. JIT compiling 404 transforms intermediate code 402 into compiled code 408 that includes one or more functions that may be consumed by a processor. However, instead of compiling the entirety of intermediate code 402 to produce one static file for compiled code 408, JIT compiling 404 compiles parts of intermediate code 402 into portions of compiled code 408. This JIT compiling 404 may be performed as it is needed, as it is requested, as time permits, and so forth.

As illustrated, intermediate code 402 includes four functions: function One( ), function Two( ), function Three( ), and function Four( ). JIT compiler 404 compiles these four respective intermediate code 402 parts into four respective portions of compiled code 408: function One( ), function Two( ), function Three( ), and function Four( ). However, the order of the functions has changed during the compiling because the compiling is performed as each function is called, which may not be in the same order as the functions are presented within intermediate code 402.

Thus, functions may be compiled in an unknown, unpredictable, and/or non-sequential order by JIT compiler 404 in a runtime environment 406. Furthermore, one or more functions of intermediate code 402 may not be compiled into one or more functions for compiled code 408 in any given session for runtime environment 406. For example, a given function of intermediate code 402 may not be compiled for compiled code 408 until it is called, and it may not be called in a given session.

When executing functions of compiled code 408, exceptions can be experienced. Consequently, an exception handling mechanism is also employed for compiled code 408. One approach is to create at least one dynamic function table 304 for compiled code 408. However, each dynamic function table 304 is established based on a high level range of addresses, and such a high level range of addresses for multiple functions is not known for compiled code 408 because functions are being dynamically added thereto.

Another approach is to create a new dynamic function table 304 for each newly compiled function of compiled code 408. The first address and the last address, as well as an unwind pointer (e.g., for the CA-to-pointer information), is known and/or can be determined by runtime environment 406 at the time of compiling for any given individual function. However, in a runtime environment 406 with JIT compiling 404, there may be thousands and thousands of such JIT compiled functions for compiled code 408. Dynamic function table linked list 302 can therefore extend to over 100,000 dynamic function tables 304 that are linked together. Searching such a linked list is time consuming and can degrade performance.

Yet another approach is to further rely on runtime environment 406 to manage some of the exception handling responsibilities for compiled code 408 that has been JIT compiled 404. This approach is described further herein. For example, a callback dynamic function table 410 that corresponds to multiple functions of compiled code 408 can be employed. This correspondence 414 between multiple functions of compiled code 408 and callback dynamic function table 410 is described further below.

Callback dynamic function table 410 includes a callback function 412. Callback dynamic function table 410 may be used in a separate dynamic function table linked list 302 with no dynamic function tables 304, or callback dynamic function table 410 may be included in a dynamic function table linked list 302 with sorted and/or unsorted dynamic function tables 304.

When handling an exception for a given function of compiled code 408 that corresponds to callback dynamic function table 410, the OS that is performing the exception dispatching initiates callback function 412. Initiating callback function 412 notifies runtime 406 of an exception with respect to the given function. Responsive to a call to callback function 412, runtime 406 consults the code, state, and/or other information that it is managing, especially as they relate to the given function. Runtime 406 responds to the OS with information that is sufficient to enable the OS to continue with exception handling. For example, runtime 406 can provide the OS with exception handling and/or unwind information by (i) determining and (ii) passing a reference to CA-to-pointer information for the given function to the OS.

Figure 5:
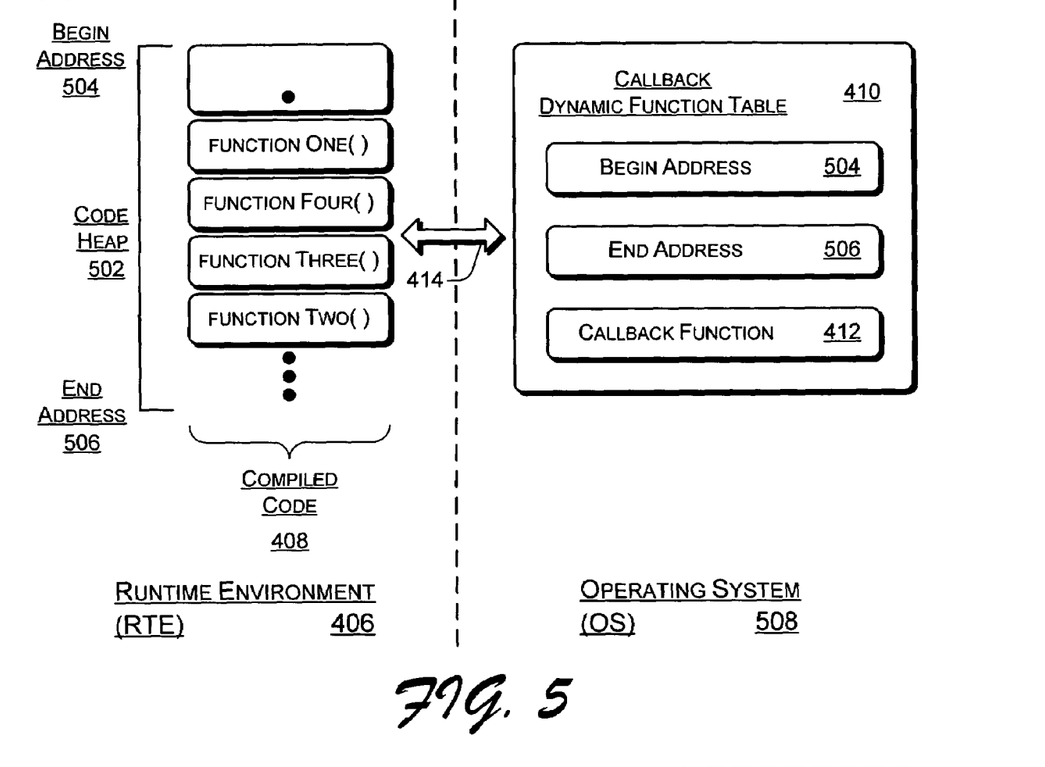
FIG. 5 illustrates an exemplary callback-type dynamic function table, which includes a callback function, and a related operating environment.

FIG. 5 illustrates an exemplary callback-type dynamic function table 410, which includes a callback function 412, and a related operating environment. The operating environment includes operating system (OS) 508 and runtime environment 406 (or runtime 406/runtime component 406).

In a described implementation, OS 508 manages callback-type dynamic function tables 410 that include a callback function 412. This management may be separate from the management of any other exception handling/unwinding mechanisms. Alternatively, OS 508 may manage callback-type dynamic function tables 410 in conjunction with the management of dynamic function tables 304 of dynamic function table linked list 302. For example, callback-type dynamic function tables 410 may be linked into dynamic function table linked list 302 along with dynamic function tables 304.

As illustrated, runtime environment 406 includes compiled code 408. Compiled code 408 includes compiled versions of function One( ), function Two( ), function Three( ), function Four( ), and so forth. As noted above, with JIT compiling 404, functions for a given process are compiled from intermediate code 402 when (and if) requested. Consequently, the size that is ultimately occupied by the given process is often unknown as a first function, such as function One( ) of compiled code 408, is being executed by a processor.

To account for this unknown ultimate size for the given process, runtime environment 406 allocates (or has allocated) a chunk of memory of a relatively arbitrary size from one or more heaps. This chunk of memory may then be shared by multiple processes as well as by multiple functions.

Code heap 502 is a chunk of memory that has been allocated for runtime environment 406 by runtime environment 406 and/or by OS 508. Code heap 502 has a begin address 504 and an end address 506. Although not so explicitly illustrated in FIG. 5, code heap 502 may include functions and other information for multiple processes, as well as heap managing information for use by runtime 406.

In a described implementation, there is a correspondence between code heap 502 and callback dynamic function table 410. Callback dynamic function table 410 includes (e.g., values for) begin address 504 and end address 506 of code heap 502. In other words, callback dynamic function table 410 corresponds to code for functions between begin address 504 and end address 506 of code heap 502, and begin address 504 and end address 506 of callback dynamic function table 410 reflects this correspondence.

As a result, each callback-type dynamic function table 410 may correspond to multiple functions for one process and/or multiple functions across multiple processes. Because each callback-type dynamic function table 410 corresponds to multiple functions, dynamic function table linked list 302 is grown at a significantly reduced rate (as compared to one dynamic function table 304 per function). Dynamic function table linked list 302 is therefore shorter and more quickly searched and otherwise more easily managed by OS 508.

In an example use of callback dynamic function table 410, when an exception is discovered and exception handling/unwind information is being acquired by OS 508 for a current function associated with a current instruction pointer, OS 508 searches dynamic function table linked list 302. OS 508 searches dynamic function table linked list 302 by moving along dynamic function tables 304 and/or callback-type dynamic function tables 410 until address checking determines that the current instruction pointer is between begin address 504 and end address 506 of callback dynamic function table 410. OS 508 then initiates callback function 412 of callback dynamic function table 410. When OS 508 makes a call to callback function 412, OS 508 is effectively asking/requesting runtime environment 406 for help in acquiring exception handling/unwind information. Responsive to callback function 412, runtime 406 provides information to OS 508 to help with exception handling/unwinding.

Figure 6:
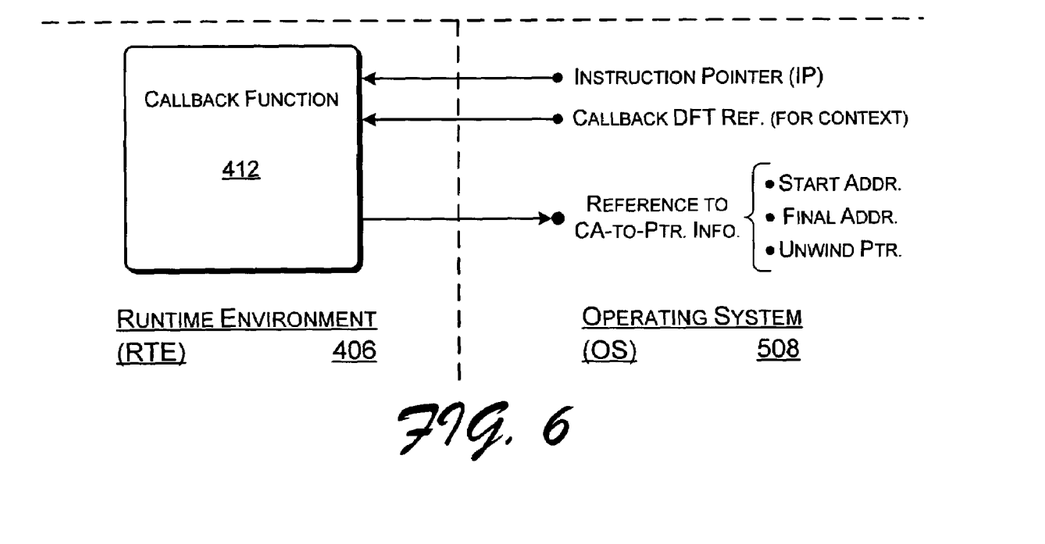
FIG. 6 illustrates an exemplary callback function and input/output parameters thereof.

FIG. 6 illustrates an exemplary callback function 412 and input/output parameters thereof. Exemplary input parameters for callback function 412 are an instruction pointer and a callback dynamic function table reference for context. An exemplary output parameter for callback function 412 is a reference to CA-to-pointer information.

When OS 508 calls callback function 412, OS 508 includes a current instruction pointer and a reference to the callback dynamic function table 410 that was discovered to have a begin address 504 and an end address 506 that jointly form a range that contains the current instruction pointer. Thus, the current instruction pointer and the callback dynamic function table reference are passed from OS 508 to runtime environment 406 for callback function 412. Runtime 406 performs the exception handling/unwinding callback analysis for callback function 412 and passes back to OS 508 a reference to CA-to-pointer information for the function associated with the current instruction pointer. This analysis is described further below with particular reference to FIGS. 7 and 9.

The reference to CA-to-pointer information references CA-to-pointer information for the function currently at issue (e.g., being unwound and/or considered for exception handling abilities). This reference to CA-to-pointer information may be, for example, a pointer to CA-to-pointer information that is stored in a code heap 502 by runtime 406 for the function at issue. Upon following the reference, OS 508 may attain the CA-to-pointer information for the function of the current instruction. This CA-to-pointer information may include a start address, a final address, and an unwind pointer for the function that is associated with the current instruction. This information as it relates to the associated function at issue is described further below with reference to FIG. 7.

Figure 7:
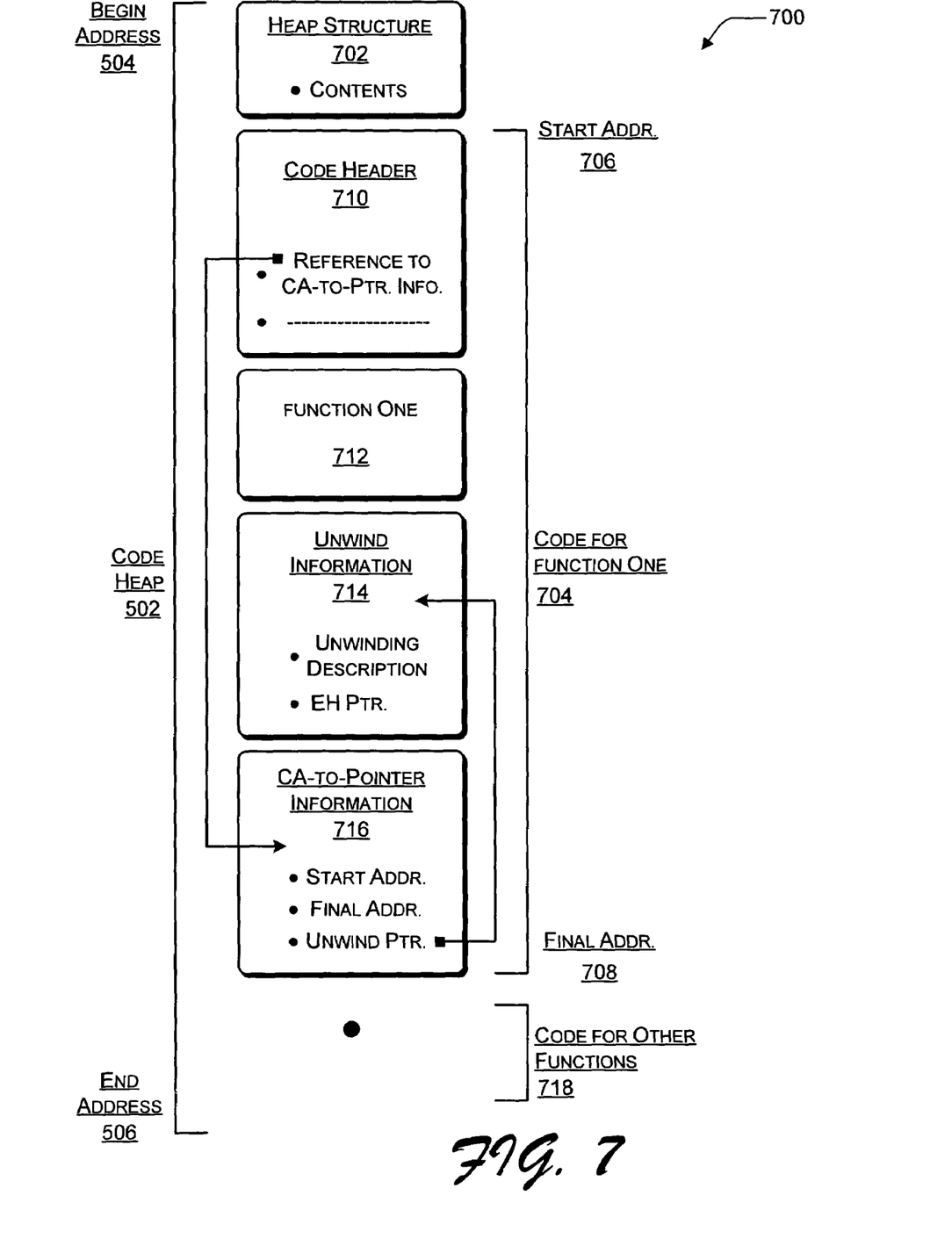
FIG. 7 illustrates an exemplary code heap organization for JIT code compilation.

FIG. 7 illustrates an exemplary code heap organization 700 for JIT code compilation 404. A runtime 406 (of FIGS. 4-6) establishes a chunk of code in which runtime 406 is to store code for functions, heap managing information, and so forth. This chunk of code, or code heap 502, has a begin address 504 and an end address 506. Begin address 504 and end address 506 of code heap 502 are known by and/or provided to an OS 508 (of FIGS. 5 and 6). Although one code heap 502 is illustrated, each runtime environment 406 may have two or more such code heaps 502.

As illustrated, code heap 502 includes a heap structure 702, a code for function One 704, code for (one or more) other functions 718, and so forth. Heap structure 702 includes information for managing (e.g., organizing, controlling, etc.) code heap 502. For example, heap structure 702 may include contents (e.g., a table, an index, etc.) that identifies functions that are included as part of code heap 502. These identifications may include the address locations/ranges of different code segments for different functions of code heap 502, such as code for function One 704.

Code for function One 704 is bounded by start address 706 and final address 708. Code for function One 704 includes multiple portions: a code header 710, function One 712, unwind information 714, and CA-to-pointer information 716. Each of these portions of code for function One 704, as indicated by the dashed line in code header 710, may include aspects in addition to those illustrated in FIG. 7 and described below.

Function One 712 includes the machine language, chip-consumable instructions for function One. Code header 710 includes a reference to CA-to-pointer information, which points to CA-to-pointer information 716.

CA-to-pointer information 716 includes a start address, a final address, and an unwind pointer. The values of the start address and the final address equate to and/or reflect start address 706 and final address 708, respectively. The unwind pointer references unwind information 714.

Unwind information 714 includes unwind information and an exception handling pointer. The exception handling pointer, if present, references exception handling information for function One. The unwinding description describes how to unwind the stack from function One to the preceding function. This unwinding description may be used by, for example, OS 508 to unwind the stack.

Each of these addresses, such as start address 706 and final address 708, may be RVA addresses that are offsets from or relative to begin address 504 of code heap 502. Hence, the start address and the final address of CA-to-pointer information 716 may be stored as RVA addresses. Similarly, both of (i) the reference to CA-to-pointer information of code header 710 and (ii) the unwind pointer of CA-to-pointer information 716 may effectuate their respective references relative to begin address 504.

Application of and interaction with code heap organization 700 in the context of using and creating a callback dynamic function table 410 is described further below with reference to FIG. 8 and FIG. 9, respectively.

Figure 8:
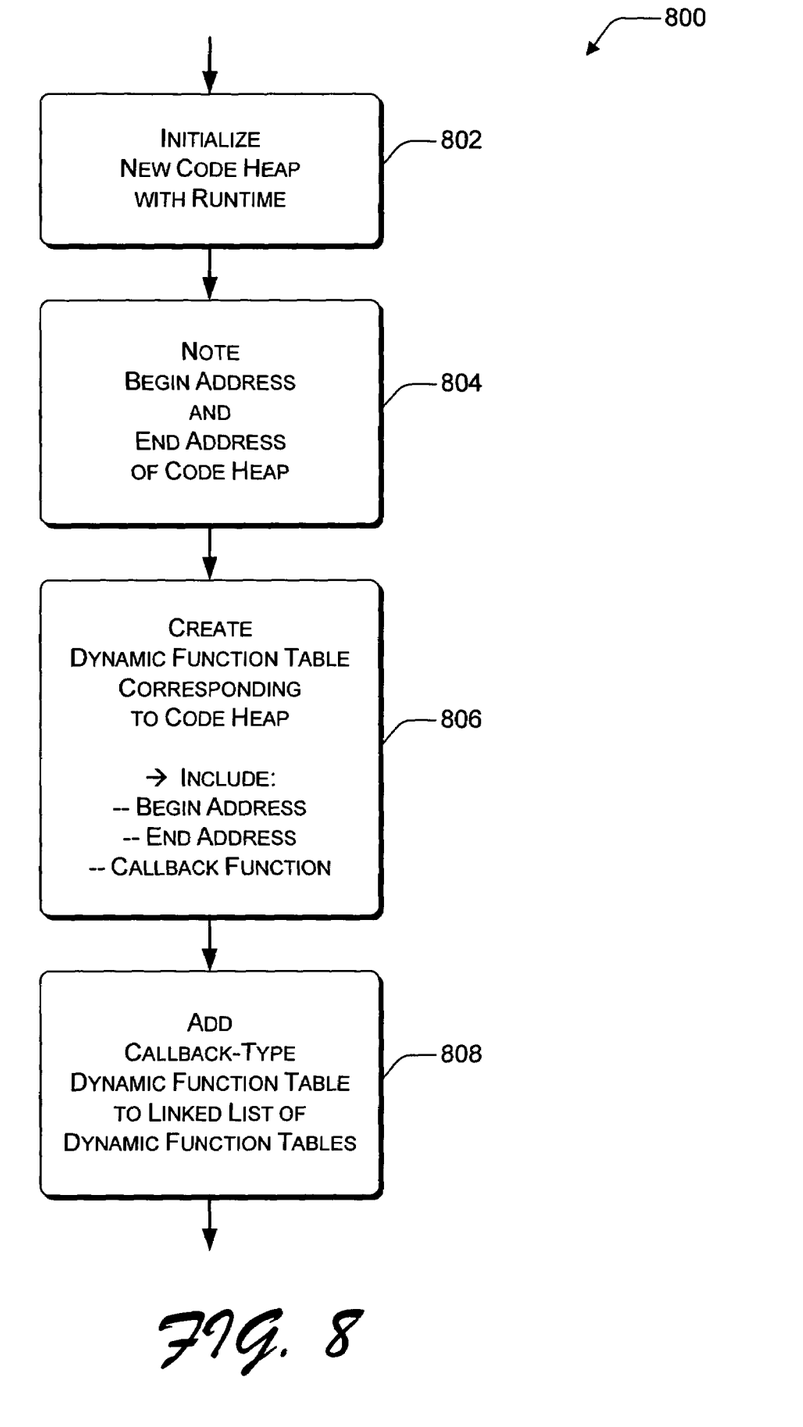
FIG. 8 is a flow diagram that illustrates an exemplary method for creating a callback-type dynamic function table.

FIG. 8 is a flow diagram 800 that illustrates an exemplary method for creating a callback-type dynamic function table. Flow diagram 800 includes four (4) blocks 802-808. Although the actions of flow diagram 800 may be performed in any operating environment, FIGS. 3-7 are used to illuminate certain aspects of the method.

At block 802, a new code heap is initialized with a runtime environment. For example, runtime 406 may initialize code heap 502. At block 804, a begin address and an end address of the new code heap is noted. For example, runtime 406 may note begin address 504 and end address 506 for code heap 502. It should be noted that the new code heap initialization may be effectuated with the cooperation of an allocator or similar component that may be a constituent of OS 508.

At block 806, a dynamic function table is created that corresponds to the code heap. The dynamic function table is created with the noted begin address, the noted end address, and a callback function. For example, a callback dynamic function table 410 that includes begin address 504, end address 506, and callback function 412 may be created by runtime 406, by OS 508, by a combination of runtime 406 and OS 508, and so forth.

In a described implementation, runtime 406 causes OS 508 to create callback dynamic function table 410 by requesting an addition to dynamic function table linked list 302. For example, runtime 406 can use an application programming interface (API) to request that OS 508 create a new table in dynamic function table linked list 302.

By way of example only, for a Microsoft® Windows® OS, a runtime component can call an Install Dynamic Function Table(table, first address, last address, . . . ) API, with the table parameter set to callback dynamic function table, the first address set to begin address, and the last address set to end address. The table parameter may also be set to sorted dynamic function table or unsorted dynamic function table when installing non-callback-type dynamic function tables. Generally, OS 508 may also provide an API for use by runtime 406 in order to remove a dynamic function table (including callback-type dynamic function tables 410) from dynamic function table linked list 302.

At block 808, a callback-type dynamic function table for the code heap is added to a linked list of dynamic function tables. For example, callback dynamic function table 410, which includes begin address 504, end address 506, and callback function 412, may be added to dynamic function table linked list 302. If dynamic function table linked list 302 is managed by OS 508, then OS 508 adds callback dynamic function table 410 thereto.

Figure 9:
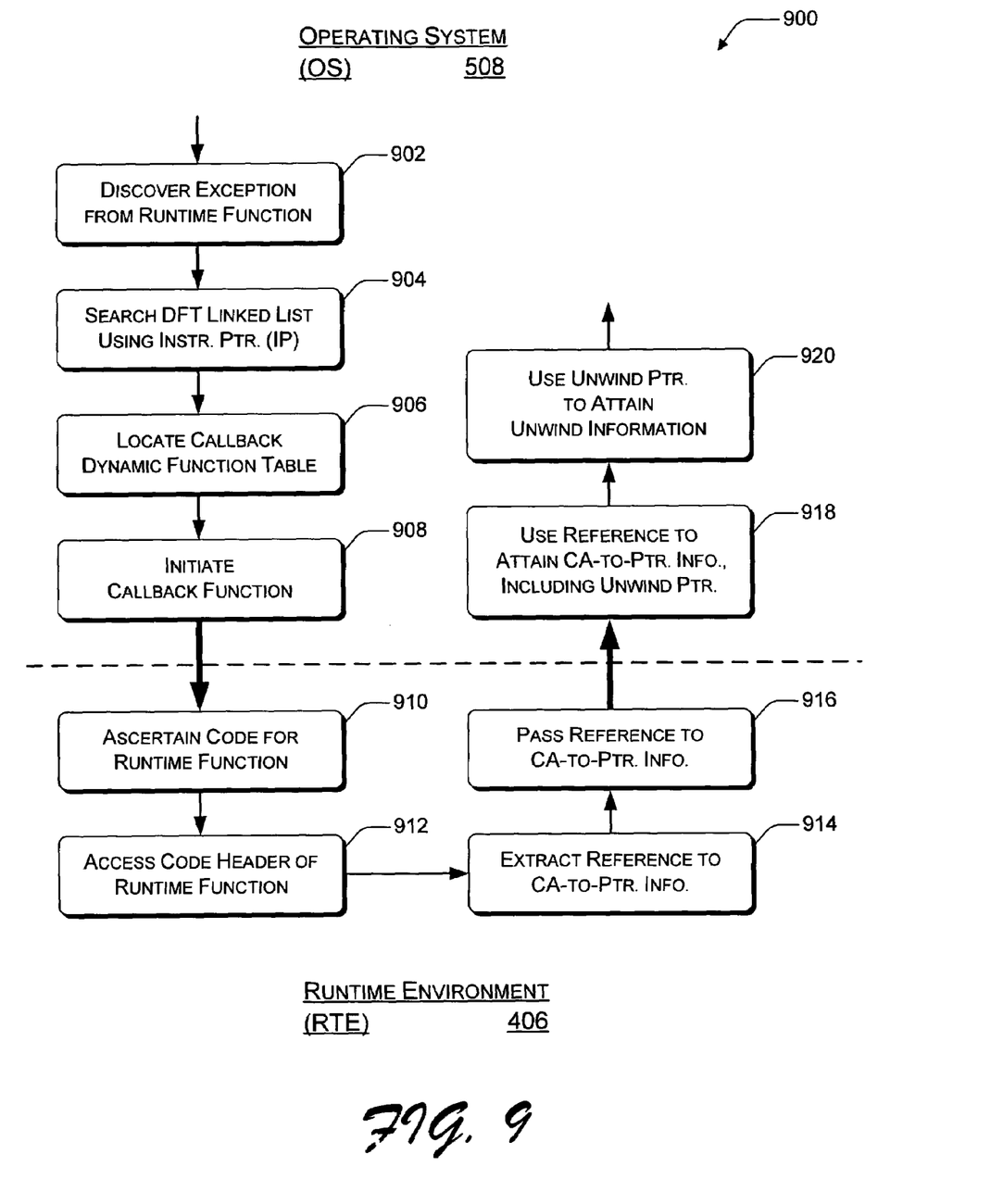
FIG. 9 is a flow diagram that illustrates an exemplary method for using a callback-type dynamic function table.

FIG. 9 is a flow diagram 900 that illustrates an exemplary method for using a callback-type dynamic function table. Flow diagram 900 includes ten (10) blocks 902-920. Although the actions of flow diagram 900 may be performed in any operating environment, FIGS. 3-7 are used to illuminate certain aspects of the method. Moreover, flow diagram 900 is divided into two parts: OS 508 and runtime environment 406. As illustrated, OS 508 performs the actions of blocks 902-908 and blocks 918-920, and runtime environment 406 performs the actions of blocks 910-916.

At block 902, an exception is discovered that results from execution of a function in a runtime environment. For example, an exception may result from execution of function One (using the machine language of function One 712) in runtime environment 406. It should be noted that OS 508 may not be aware at the time of the exception that the code responsible for the exception is being executed as part of runtime environment 406.

With the discovery of the exception, OS 508 begins an exception handling procedure that typically includes unwinding one or more frames of the stack. Although the description herein focuses on exception handling as a result of an exception that occurs with/in runtime environment 406, exceptions also occur at addresses that fall within the range of currently loaded static executable images. OS 508 therefore considers, at least from time to time, both static unwind tables (not explicitly shown in FIGS. 3-10) for files that are not part of runtime environment 406 and at least one dynamic function table linked list 302. Generally, upon discovery of an exception, OS 508 first searches the static unwind tables. If the corresponding unwinding information, etc. cannot be attained through the static unwind tables, OS 508 then searches dynamic function table linked list 302. However, OS 508 may alternatively search dynamic function table linked list 302 prior to and/or overlapping with a search of the static unwind tables.

At block 904, a dynamic function table linked list is searched using the current instruction pointer. For example, the high level ranges of sorted/unsorted dynamic function tables 304 may be searched as well as begin/end addresses 504/506 of callback-type dynamic function tables 410 as OS 508 moves along dynamic function tables of dynamic function table linked list 302.

At block 906, the callback dynamic function table for the current instruction pointer is located. For example, a callback dynamic function table 410 that has a begin address 504 that is lower than and an end address 506 that is higher than the current instruction pointer may be located.

At block 908, the callback function is initiated. For example, OS 508 can call callback function 412 using the current instruction pointer and a reference to the located callback dynamic function table 410 as arguments for the call. Initiating the callback function serves to notify runtime environment 406 that OS 508 is requesting exception handling and/or unwinding information to handle an exception with regard to the current instruction pointer.

At block 910, responsive to initiation of the callback function and the current instruction pointer, code for the runtime function is ascertained. For example, runtime environment 406 may consult a global table that covers multiple code heaps 502. Such a global table includes an entry for each runtime function that maps (i) start address 706/final address 708 code ranges for each code for functions 704/718 to (ii) code headers 710. If a global table is employed, the mapping may also include an identification of the relevant code heap 502, especially if RVA addresses are used.

Alternatively, a table (of multiple tables) with mappings similar to those described above for a global table may be included at each heap structure 702 where the table is for the functions included in the associated code heap 502. If multiple such per-code-heap tables are employed, runtime environment 406 searches each table at each heap structure 702 until the function associated with the current instruction pointer is ascertained. Runtime environment 406 may also maintain a table that maps code heaps 502 to address ranges defined by begin/end addresses 504/506 so that the relevant heap structure 702 may be ascertained without searching through multiple heap structures 702.

At block 912, a code header of the runtime function is accessed. For example, once the code for the function associated with the current instruction pointer is ascertained, then code header 710 therefor may be accessed. In short, the actions of blocks 910 and 912 may correspond to (i) finding a code heap 502 for the current instruction pointer and (ii) finding/accessing a code header 710 of code heap 502 for the current instruction pointer. In the description that follows, code for function One 704 is used as an example. Thus, code header 710 of code for function One 704 may be inspected as part of the accessing.

At block 914, a reference to CA-to-pointer information is extracted from the code header of the runtime function. For example, the reference to CA-to-pointer information may be extracted from code header 710. At block 916, the reference to CA-to-pointer information is passed to the operating system as a response to and/or output of the callback function. For example, the reference to CA-to-pointer information of code header 710 that references CA-to-pointer information 716 may be provided from runtime environment 406 to OS 508.

More generally, runtime environment 406 may provide to OS 508 data for CA-to-pointer information. This data for CA-to-pointer information may comprise a reference to CA-to-pointer information 716. Alternatively, this data for CA-to-pointer information may comprise CA-to-pointer information 716. In other words, runtime environment 406 may alternatively directly provide to OS 508 the start address value, the final address value, and/or an unwind pointer for code for function One 704.

At block 918, the reference to CA-to-pointer information is used to attain the CA-to-pointer information. This CA-to-pointer information includes an unwind pointer that points to unwind information. For example, OS 508 may use the reference to CA-to-pointer information, possibly in conjunction with begin address 504 if relative addressing is employed, to attain the CA-to-pointer information from CA-to-pointer information 716. CA-to-pointer information 716 includes an unwind pointer that points to unwind information 714.

At block 920, the unwind pointer is used to attain unwind information. For example, the unwind pointer attained from CA-to-pointer information 716 may be used by OS 508 to access unwind information 714 and to extract the unwinding description therefrom. OS 508 may then unwind the frame on the stack that is associated with function One.

The aspects, features, components, etc. of FIGS. 3-7 and the methods of FIGS. 8 and 9, for example, are illustrated in diagrams that are divided into multiple blocks. However, the order and/or layout in which the operating environments and methods are described and/or shown is not intended to be construed as a limitation, and any number of the blocks can be combined, rearranged, augmented, omitted, etc. in any manner to implement one or more systems, methods, devices, procedures, media, APIs, apparatuses, arrangements, etc. for exception handling. Furthermore, although the description herein includes references to specific implementations such as those of FIGS. 3-7 (as well as the exemplary operating environment of FIG. 10), the operating environments and methods can be implemented in any suitable hardware, software, firmware, or combination thereof and using any suitable runtime language(s), runtime environment(s), application programming interface(s), memory structure(s), and so forth.

Figure 10:
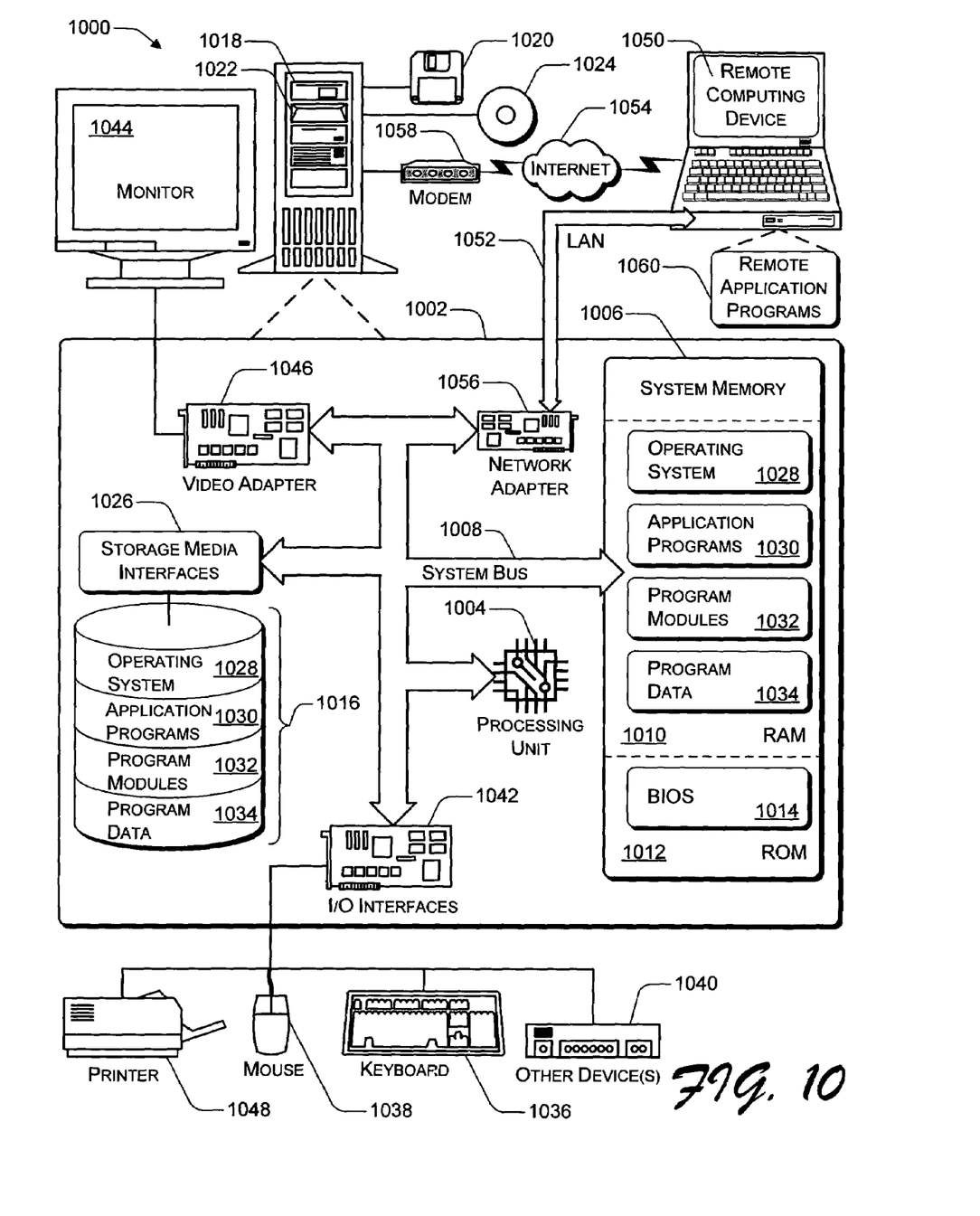
FIG. 10 illustrates an exemplary computing (or general electronic device) operating environment that is capable of (wholly or partially) implementing at least one aspect of exception handling as described herein.

FIG. 10 illustrates an exemplary computing (or general electronic device) operating environment 1000 that is capable of (fully or partially) implementing at least one system, device, apparatus, component, arrangement, protocol, approach, method, procedure, API, some combination thereof, etc. for exception handling as described herein. Computing environment 1000 may be utilized in the computer and network architectures described below or in a stand-alone situation.

Exemplary electronic device operating environment 1000 is only one example of an environment and is not intended to suggest any limitation as to the scope of use or functionality of the applicable electronic (including computer, game console, television, etc.) architectures. Neither should electronic device environment 1000 be interpreted as having any dependency or requirement relating to any one or to any combination of components as illustrated in FIG. 10.

Additionally, exception handling may be implemented with numerous other general purpose or special purpose electronic device (including computing system) environments or configurations. Examples of well known electronic (device) systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, distributed or multi-processing computing environments that include any of the above systems or devices, some combination thereof, and so forth.

Implementations for exception handling may be described in the general context of electronically-executable instructions. Generally, electronically-executable instructions include routines, programs, objects, components, data structures, etc. that perform particular tasks or implement particular abstract data types. Exception handling, as described in certain implementations herein, may also be practiced in distributed computing environments where tasks are performed by remotely-linked processing devices that are connected through a communications link and/or network. Especially in a distributed computing environment, electronically-executable instructions may be located in separate storage media, executed by different processors, and/or propagated over transmission media.

Electronic device environment 1000 includes a general-purpose computing device in the form of a computer 1002, which may comprise any electronic device with computing and/or processing capabilities. The components of computer 1002 may include, but are not limited to, one or more processors or processing units 1004, a system memory 1006, and a system bus 1008 that couples various system components including processor 1004 to system memory 1006.

System bus 1008 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1102 typically includes a variety of electronically-accessible media. Such media may be any available media that is accessible by computer 1002 or another electronic device, and it includes both volatile and non-volatile media, removable and non-removable media, and storage media.

System memory 1006 includes electronically-accessible storage media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is typically stored in ROM 1012. RAM 1010 typically contains data and/or program modules/instructions that are immediately accessible to and/or being presently operated on by processing unit 1004.

Computer 1002 may also include other removable/non-removable and/or volatile/non-volatile storage media. By way of example, FIG. 10 illustrates a hard disk drive or disk drive array 1016 for reading from and writing to a (typically) non-removable, non-volatile magnetic media (not separately shown); a magnetic disk drive 1018 for reading from and writing to a (typically) removable, non-volatile magnetic disk 1020 (e.g., a "floppy disk"); and an optical disk drive 1022 for reading from and/or writing to a (typically) removable, non-volatile optical disk 1024 such as a CD-ROM, DVD, or other optical media. Hard disk drive 1016, magnetic disk drive 1018, and optical disk drive 1022 are each connected to system bus 1008 by one or more storage media interfaces 1026. Alternatively, hard disk drive 1016, magnetic disk drive 1018, and optical disk drive 1022 may be connected to system bus 1008 by one or more other separate or combined interfaces (not shown).

The disk drives and their associated electronically-accessible media provide non-volatile storage of electronically-executable instructions, such as data structures, program modules, and other data for computer 1002. Although exemplary computer 1002 illustrates a hard disk 1016, a removable magnetic disk 1020, and a removable optical disk 1024, it is to be appreciated that other types of electronically-accessible media may store instructions that are accessible by an electronic device, such as magnetic cassettes or other magnetic storage devices, flash memory, CD-ROM, digital versatile disks (DVD) or other optical storage, RAM, ROM, electrically-erasable programmable read-only memories (EE-PROM), and so forth. Such media may also include so-called special purpose or hard-wired integrated circuit (IC) chips. In other words, any electronically-accessible media may be utilized to realize the storage media of the exemplary electronic system and environment 1000.

Any number of program modules (or other units or sets of instructions/code) may be stored on hard disk 1016, magnetic disk 1020, optical disk 1024, ROM 1012, and/or RAM 1010, including by way of general example, an operating system 1028, one or more application programs 1030, other program modules 1032, and program data 1034. By way of example but not limitation, operating system 1028 may correspond to OS 508.

A user may enter commands and/or information into computer 1002 via input devices such as a keyboard 1036 and a pointing device 1038 (e.g., a "mouse"). Other input devices 1040 (not shown specifically) may include a microphone, joystick, game pad, satellite dish, serial port, scanner, and/or the like. These and other input devices are connected to processing unit 1004 via input/output interfaces 1042 that are coupled to system bus 1008. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 1044 or other type of display device may also be connected to system bus 1008 via an interface, such as a video adapter 1046. Video adapter 1046 (or another component) may be or may include a graphics card for processing graphics-intensive calculations and for handling demanding display requirements. Typically, a graphics card includes a graphics processing unit (GPU), video RAM (VRAM), etc. to facilitate the expeditious performance of graphics operations. In addition to monitor 1044, other output peripheral devices may include components such as speakers (not shown) and a printer 1048, which may be connected to computer 1002 via input/output interfaces 1042.

Computer 1002 may operate in a networked environment using logical connections to one or more remote computers, such as a remote computing device 1050. By way of example, remote computing device 1050 may be a personal computer, a portable computer (e.g., laptop computer, tablet computer, PDA, mobile station, etc.), a palm or pocket-sized computer, a watch, a gaming device, a server, a router, a network computer, a peer device, other common network node, or another electronic device type as listed above, and so forth. However, remote computing device 1050 is illustrated as a portable computer that may include many or all of the elements and features described herein with respect to computer 1002.

Logical connections between computer 1002 and remote computer 1050 are depicted as a local area network (LAN) 1052 and a general wide area network (WAN) 1054. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth.

When implemented in a LAN networking environment, computer 1002 is usually connected to LAN 1052 via a network interface or adapter 1056. When implemented in a WAN networking environment, computer 1002 typically includes a modem 1058 or other means for establishing communications over WAN 1054. Modem 1058, which may be internal or external to computer 1002, may be connected to system bus 1008 via input/output interfaces 1042 or any other appropriate mechanism(s). It is to be appreciated that the illustrated network connections are exemplary and that other means of establishing communication link(s) between computers 1002 and 1050 may be employed.

In a networked environment, such as that illustrated with electronic device environment 1000, program modules or other instructions that are depicted relative to computer 1002, or portions thereof, may be fully or partially stored in a remote memory storage device. By way of example, remote application programs 1060 reside on a memory component of remote computer 1050 but may be usable or otherwise accessible via computer 1002. Also, for purposes of illustration, application programs 1030 and other electronically-executable instructions such as operating system 1028 are illustrated herein as discrete blocks, but it is recognized that such programs, components, and other instructions reside at various times in different storage components of computing device 1002 (and/or remote computing device 1050) and are executed by data processor(s) 1004 of computer 1002 (and/or those of remote computing device 1050).

Although systems, media, devices, methods, procedures, apparatuses, techniques, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more electronically-accessible media having stored thereon electronically-executable instructions that utilize an application programming interface, the application programming interface facilitating creation of callback-type dynamic function tables; each callback-type dynamic function table including a begin address, an end address, and a callback function, each callback-type dynamic function table corresponding to a code heap that stores code for a plurality of functions in a runtime environment; wherein interaction between the runtime environment and an operating system is precipitated upon calling the callback function to acquire exception handling or unwind information;

wherein the interaction between the runtime environment and the operating system comprises (i) the operating system requesting exception handling or unwind information from the runtime environment and (ii) the runtime environment providing the exception handling or unwind information to the operating system;

wherein the begin address and the end address of each callback-type dynamic function table comprises a begin address and an end address of a respective code heap to which a respective callback-type dynamic function table corresponds;

wherein the exception handling or unwind information comprises data for code address-to-pointer information for a particular function of the plurality of functions; and wherein each callback-type dynamic function table is created, at least in part, by adding each callback-type dynamic function table to a linked list of dynamic function tables.

2. The one or more electronically-accessible media as recited in claim 1, wherein the particular function of the plurality of functions is ascertained using an instruction pointer that is passed as an argument of the callback function.

3. The one or more electronically-accessible media as recited in claim 1, wherein each callback-type dynamic function table is created, at least in part, by adding each callback-type dynamic function table to a linked list of dynamic function tables.

4. The one or more electronically-accessible media as recited in claim 3, wherein the linked list of dynamic function tables includes one or more non-callback-type dynamic function tables.

5. An electronic device comprising:
at least one processor;
a system memory;
a runtime environment that is managing code for a plurality of functions; and
an operating system that is managing a linked list of dynamic function tables including a callback dynamic function table, wherein the linked list is searched when an exception occurs, wherein the callback dynamic function table comprises a begin address, an end address and a callback function, each callback dynamic function table corresponding to a code heap that stores code for the plurality of functions;

the operating system configured to call the callback function when the exception occurs within an address range bounded by the begin address and the end address of the callback dynamic function table of the linked list of dynamic function tables to request that the runtime environment provide exception handling or unwind information for at least one function of the plurality of functions;

wherein the runtime environment is configured to provide to the operating system the exception handling or unwind information for the at least one function of the plurality of functions responsive to calling the callback function.

6. The electronic device as recited in claim 5, wherein the runtime environment comprises at least one just-in-time (JIT) compiler.

7. The electronic device as recited in claim 5, wherein the exception handling or unwind information comprises data for code address-to-pointer information for the at least one function of the plurality of functions.

8. The electronic device as recited in claim 7, wherein the data for code address-to-pointer information for the at least one function of the plurality of functions directly or indirectly provides to the operating system a start address, a final address, and an unwind pointer for the at least one function of the plurality of functions.

9. One or more electronically-accessible media having stored thereon electronically-executable instructions that include:

a callback function, the callback function accepting as input an instruction pointer that is associated with an address of a function from a runtime environment and producing as output data for code address-to-pointer information for the function having the address that is associated with the instruction pointer;

wherein the callback function may be called by an operating system and implemented by the runtime environment; and the operating system managing a linked list of dynamic function tables including a callback dynamic function table, wherein the linked list is searched when an exception occurs, wherein the callback dynamic function table comprises a begin address, an end address and the callback function;

the operating system configured to call the callback function when the exception occurs within an address range bounded by the begin address and the end address of the callback dynamic function table of the linked list of dynamic function tables to request that the runtime environment provide exception handling or unwind information for the function.

10. The one or more electronically-accessible media as recited in claim 9, wherein the begin address and the end address define an address range that includes the instruction pointer.

11. The one or more electronically-accessible media as recited in claim 9, wherein the data for code address-to-pointer information that is output by the callback function is provided from the runtime environment to the operating system.

12. The one or more electronically-accessible media as recited in claim 9, wherein the data for code address-to-pointer information comprises a reference to the code address-to-pointer information.

13. The one or more electronically-accessible media as recited in claim 12, wherein the referenced code address-to-pointer information comprises a start address, a final address, and an unwind pointer for the function having the address that is associated with the instruction pointer.

14. The one or more electronically-accessible media as recited in claim 9, wherein the data for code address-to-pointer information comprises the code address-to-pointer information.

15. The one or more electronically-accessible media as recited in claim 9, wherein the callback function is implemented, at least partially, by the runtime environment by inspecting a code header for the function having the address that is associated with the instruction pointer.

16. The one or more electronically-accessible media as recited in claim 15, wherein the data for code address-to-pointer information is derived using the code header.

17. The one or more electronically-accessible media as recited in claim 15, wherein the code header is ascertained using a heap structure contents of a code heap that includes code for the function having the address that is associated with the instruction pointer.

18. The one or more electronically-accessible media as recited in claim 9, wherein the callback dynamic function table having the callback function corresponds to at least two functions compiled in the runtime environment by a just-in-time (JIT) compiler.

19. An electronic device comprising:
at least one processor; and
one or more media storing processor-executable instructions when executed by the at least one processor causing the electronic device to perform actions comprising:
in response to detecting an exception, searching a linked list of dynamic function tables using an instruction pointer, wherein the dynamic function tables include a callback dynamic function table, wherein the callback dynamic function table comprises a begin address, an end address and a callback function, each callback dynamic function table corresponding to a code heap that stores code for a plurality of functions managed by a runtime environment;
locating the callback dynamic function table having the callback function; wherein the locating action comprises:
locating the callback dynamic function table having the callback function from the dynamic function table linked list using the instruction pointer, the callback dynamic function table including a begin address that is less than and an end address that is greater than the instruction pointer initiating, by an operating system, the callback function to interact with the runtime environment;
receiving data for code address-to-pointer information from the runtime responsive to the initiating; and
using the received data for code address-to-pointer information to attain information for exception handling or stack unwinding.

20. The electronic device as recited in claim 19, wherein:
the receiving action comprises:
receiving a reference to code address-to-pointer information from the runtime; and
the using action comprises:
using the reference to attain code address-to-pointer information, including an unwind pointer; and
using the unwind pointer to attain unwind information.

21. The electronic device as recited in claim 19, wherein the processor-executable instructions are adapted to cause the electronic device to perform a further action comprising:
discovering an exception from a runtime function.

22. The electronic device as recited in claim 19, wherein the processor-executable instructions are adapted to cause the electronic device to perform further actions comprising:
receiving at the runtime, responsive to the initiating, the instruction pointer with a request for the data for code address-to-pointer information;
ascertaining a runtime function associated with the instruction pointer;
accessing a code header of the ascertained runtime function to extract the data for code address-to-pointer information for the ascertained runtime function; and
providing, from the runtime to the operating system, the data for code address-to-pointer information.

23. One or more electronically-accessible media having stored thereon electronically-executable instructions to perform acts comprising:
managing code via a runtime environment for a plurality of functions;
managing via an operating system a linked list of dynamic function tables including a callback dynamic function table, wherein the list is searched when an exception occurs, wherein the callback dynamic function table comprises a begin address, an end address and a callback function, each callback dynamic function table corresponding to a code heap that stores code for the plurality of functions;
calling via the operating system the callback function when the exception occurs within an address range bounded by the begin address and the end address of the callback dynamic function table of the linked list of dynamic function tables to request that the runtime environment provide exception handling or unwind information for at least one function of the plurality of functions;
wherein the runtime environment is configured to provide to the operating system the exception handling or unwind information for the at least one function of the plurality of functions responsive to calling the callback function.

24. The one or more electronically-accessible media as recited in claim 23, wherein the runtime environment comprises at least one just-in-time (JIT) compiler.

25. The one or more electronically-accessible media as recited in claim 23, wherein the exception handling or unwind information comprises data for code address-to-pointer information for the at least one function of the plurality of functions.

26. The one or more electronically-accessible media as recited in claim 23, wherein the data for code address-to-pointer information for the at least one function of the plurality of functions directly or indirectly provides to the operating system a start address, a final address, and an unwind pointer for the at least one function of the plurality of functions.

* * * * *